(12) United States Patent  
Hallsten

(10) Patent No.: US 7,422,895 B1  
(45) Date of Patent: Sep. 9, 2008

(54) BIOFILTER OR COMPOST SUPPORT ASSEMBLY

(75) Inventor: Jeffrey Hallsten, Sacramento, CA (US)

(73) Assignee: Hallsten Corporation, Sacramento, CA (US)

( * ) Notice: Subject to any disclaimer, the term of this patent is extended or adjusted under 35 U.S.C. 154(b) by 829 days.

(21) Appl. No.: 10/828,875

(22) Filed: Apr. 21, 2004

(51) Int. Cl.  
*C12M 1/16* (2006.01)  
*F26B 25/10* (2006.01)

(52) U.S. Cl. ............ 435/299.1; 435/290.1; 34/233; 34/237; 55/494

(58) Field of Classification Search .......... 435/290.1, 435/299.1; 71/9, 71; 34/233, 237; 55/494  
See application file for complete search history.

(56) References Cited

U.S. PATENT DOCUMENTS 4,262,584 A * 4/1981 Dunbar ................ 454/180

5,454,195 A 10/1995 Hallsten  
6,255,102 B1 7/2001 Hallsten

* cited by examiner

*Primary Examiner*—William H Beisner  
(74) *Attorney, Agent, or Firm*—Thomas M. Freiburger

(57) ABSTRACT

A modular support system for a bed of organic filter medium has provision for adjusting the distribution of gases in the plenum defined below the filter bed platform. Once the filter bed platform has been fully erected, with a gas inlet below the platform, slide gates are positioned in special modules which define a gas distribution channel, preferably extending in a series to form a line in the assembled support platform. The slide gates, one at each side of the special flow distribution modules, are adjusted as to the depth of penetration down into the plenum, so as to close the sides of the flow distribution channel to varying degrees along the length of the channel, effective to balance the flow of gases up through the perforations in the platform modules. The proper gate setting can be determined empirically after erection of the filter bed platform, by flowing gas through the platform and checking the distribution of gas exiting the holes in the modules. The gate settings can be adjusted until optimum balance of flow is achieved throughout the area of the platform.

15 Claims, 6 Drawing Sheets

BIOFILTER OR COMPOST SUPPORT ASSEMBLY

BACKGROUND OF THE INVENTION

This invention is concerned with biofiltration via a medium, usually a natural medium, which is effective to remove noxious odors and components from gases given off by a sewage treatment facility or industrial facility. Also, the invention concerns a composting arrangement. More specifically the invention concerns a modular support system for erecting a biofiltration or compost support bed in any desired size and shape, and with provision for control of gas distribution through the medium.

The general subject matter of this invention is addressed in U.S. Pat. No. 6,255,102, owned by the assignee of the present invention. That patent is incorporated herein by reference. This invention improves over the modular assembly shown in U.S. Pat. No. 6,255,102 by including an efficient structure and method for controlling the distribution of gases introduced into the plenum of space below the support system, so that gases are not unevenly and inefficiently distributed as they pass through the filtering medium.

Biological air pollution control has been used on an increasing basis in recent years to cleanse noxious and odorous gases, such as those emanating from a sewage treatment plant. The biological filtration systems or biofilters utilize a bed of stacked biofilter material such as compost, tree bark, peat, heather or soil, generally about three feet or more deep. The containment gas from the sewage treatment plant or other sources is blown through the biofilter material in an upward direction. The material in the biofiltration bed provides an environment for a diverse culture of microorganisms, which degrade the gaseous pollutants as they pass through the biofilter.

Such biofiltration or biological treatment of the gases is an inexpensive treatment method, but the raw gas stream must generally meet certain conditions: The pollutants should be water soluble and biodegradable, and free of toxic components. Also, there must be sufficient concentration of oxygen. Further, the gas stream should be nearly saturated with water (relative humidity at least about 95%), and at temperature between about 40° F. and 140° F. (more preferably between 50° F. and 100° F.). The odorous gas must also contain no more than small amounts of dust and grease.

These requirements usually dictate that the raw gas be preconditioned before entering into the biofilter bed. Preconditioning includes humidification, temperature control and removal of particulates.

In the biofilter itself, a biofilm covers the substrate of tree bark, peat, heather, etc. Water soluble air pollutants are absorbed into the biofilm and are decomposed into carbon dioxide and water by the microbes. The filter beds are often built on a single level, but where area is limited, multiple level biofilters have been constructed, with the raw gas stream divided and fed in parallel to the various levels of the biofilter system.

Regarding sizing of the biofilter beds, the height of the filter bed, i.e. the stack of organic material as the medium, is generally in the range of about 1 feet to 5 feet. Areas are up to tens of thousands of square feet. One rule of thumb regarding the calculation of needed area for a given waste air flow is that the "area load" or ratio between the waste gas flow rate and the filter area should be in the range of about 2.5 to 3.0 CFM/SF. The flow distribution and humidity of the inlet gas have to be carefully controlled, otherwise the filter bed will eventually clog and cease to function. Distribution throughout the area of the filter bed should be relatively even.

In addition to sewage treatment plants, biofilters are useful for treating the effluent gases from many other processes. These include factory farming, rendering plants, coffee roasters, foundries, composting plants, kraft paper drying and paint shops. The odorous emissions treatable include ammonia, hydrogen sulfide, amines, aldehydes, mercaptains, alcohols, disulfides, esters, fatty acids, unsaturated hydrocarbons, ketones, hexane, dichloromethane, formaldehyde, phenol, organic acids, acetone, toluene and others.

These biofilter systems are being used increasingly in treating the gases from sewage treatment processes and also some of the other processes listed above. Also, composting of natural materials can be conducted on a similar support bed, for active aeration of the compost material. There is a need for a relatively simple, inexpensive and modular approach for constructing a filter bed support for such processes.

Hallsten U.S. Pat. No. 5,454,195 discloses a modular containment system for preventing hazardous materials from leaching into the ground or otherwise escaping a defined containment area. That system includes peripheral modules and a liner to define the containment area, the modules being fillable by water or granular material, and the system has some relevance to the present invention described below.

Hallsten U.S. Pat. No. 6,255,102, referenced above, discloses efficient assemblies for erecting a biofiltration medium support, in several embodiments. The patent discloses a means and method for directing the flow of gases within the plenum comprising vanes which could be adjusted as desired, on erection of the filtration support, to deflect the moving gases. However, there is a need for a system capable of adjusting for proper air distribution after erection of the modular support structure, so that gas flow distribution can be tuned to maximize even distribution by actual testing after the structure has been fully erected. This is an object of the present invention described below.

SUMMARY OF THE INVENTION

The invention provides an efficient and inexpensive solution to erection of a biofilter support bed of desired area, using modular components. The components are quickly assembled on a flat site which may be unpaved ground, and with capability to produce many different sizes and rectangular shapes, as well as areas, of a filter bed support to retain a biofilter medium.

The support modules are similar in concept and for the most part similar structurally to those shown in U.S. Pat. No. 6,255,102 described above, particularly in the embodiment shown in FIGS. 7-9, but with some differences. Pursuant to the invention, particularly in an assembly having a length greater than its width, a central longitudinally extending row of special modules is included. This series of contiguous modules is designed to control the flow of gases for balanced distribution throughout the plenum below the stack of biofilter medium. The modules in this row may have fewer or smaller openings than the remaining modules in the support bed, or these modules may have no openings at all.

In one preferred embodiment, the gas distribution modules comprise rectangular units with legs extending from corners, such that a contiguous air space is defined through the length of a row or series of such modules. Each gas distribution module has a slot at each lateral side, the slots extending in vertical planes such that the left-side slots of all modules in the row are aligned, and the right-side slots of all modules in the row are aligned. The system includes slide gates which assemble down into the slots and which, if the gates are full-size, will completely block the side space between legs of the distribution module, such that gases are blocked from flowing laterally out from the channel space within the distribution module, confining the gases to longitudinally flow through the row of such modules.

However, for a balanced system very few of the modules will receive full-size slide gates. The slide gates can be preformed or trimmed to any size needed, such that they extend only part way down to the floor or ground, to any required degree, or such that they do not block the entire length of the space between legs of the module.

In the situation where the inlet for gases is at or near one end of the plenum defined by the filter bed support, which it usually is, the row of distribution modules is arranged such that the gas inlet is below one of these modules. Generally, in the immediate vicinity of the gas inlet, the slide gates will be fully blocking lateral gas flow, and, more distant from the inlet, the slide gates will leave larger and larger openings. At the remote end from the gas inlet, the slide gates will not be used, allowing full flow out of the distribution module area. If the row of distribution modules is off center in the rectangle of the assembly, the slide gates can be sized differently at the two sides of the row, allowing greater gas flow where the larger area is served.

The invention permits the entire modular filter bed support system to be erected, and subsequently flow-balanced. Thus, once the system has been erected, air or other gases can be delivered into the plenum, at the prescribed flow rate which will be encountered in actual use. An air flow meter can then be placed at a multiplicity of different positions over groups of the gas exit holes in the tops of the modules of the assembly, measuring air flow at many different points. Once this is done, the slide gates can be installed in an approximate configuration attempting to obtain the desired even distribution. Rather than cutting slide gates to a final dimension, or bringing to the site pre-formed slide gates intended to create the proper flow distribution, the full-size slide gates can be clamped, jammed or otherwise held in temporary positions, then another check of air flows at various points can be performed. In this way, over several iterations, the operator can obtain the optimum balance of flow for this system.

It is therefore a primary object of the invention to improve over U.S. Pat. No. 6,255,102 in the area of balancing gas distribution in a modular support for a biofiltration system. This and other objects, advantages and features of the invention will be apparent from the following description of a preferred embodiment, along with the accompanying drawings.

DESCRIPTION OF PREFERRED EMBODIMENTS

Figure 1:
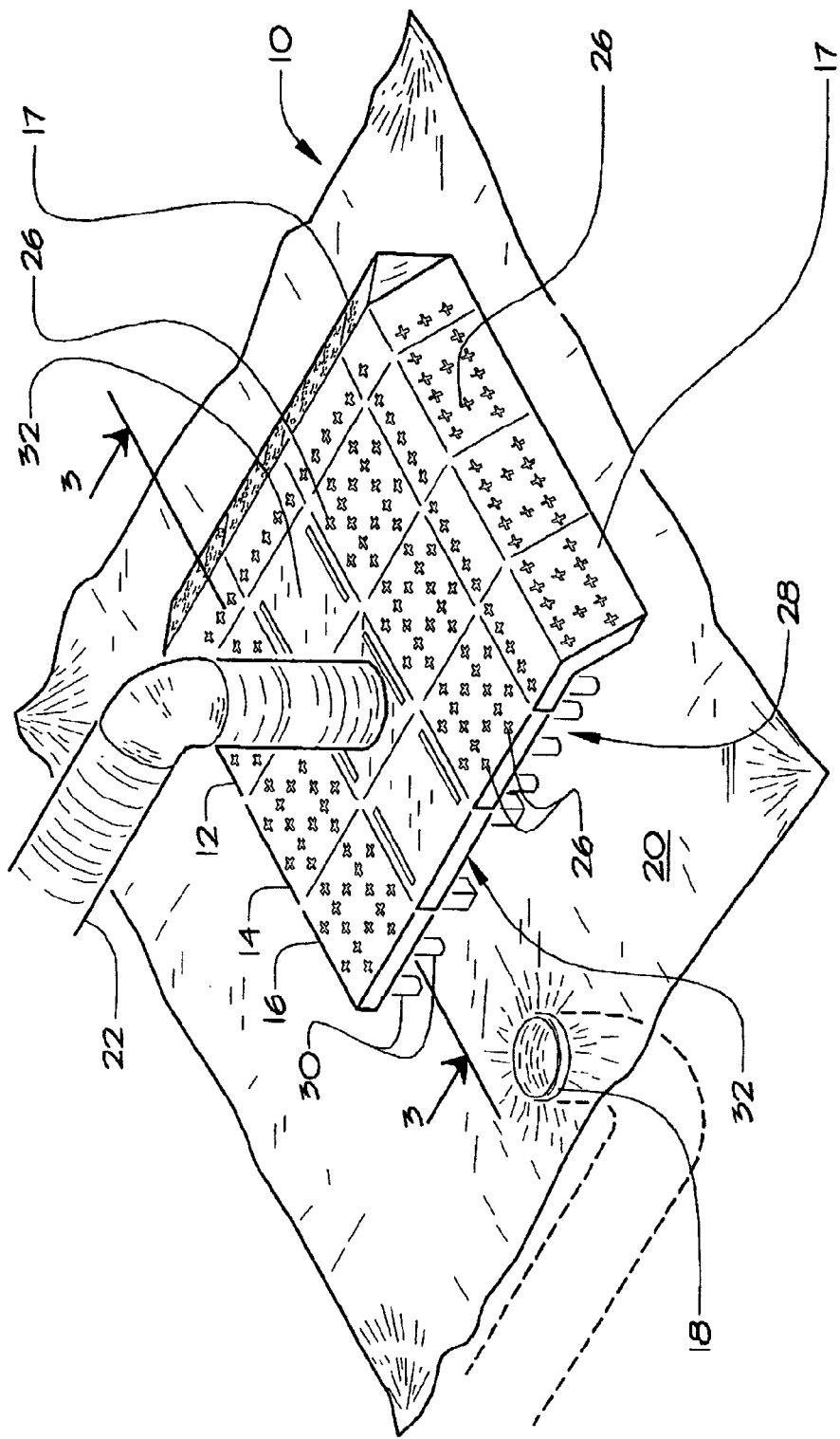
FIG. 1 is a perspective view, partially broken away, showing an assembly of filter bed support modules in accordance with the system of the invention.

FIG. 1 shows in perspective and somewhat schematically an assembly 10 of modules 12, 14, 16, etc to form a filter bed platform to support a bed of filtration medium as described above, and as described in U.S. Pat. No. 6,255,102, referenced above. Edge closure modules as in U.S. Pat. No. 6,255, 102 are shown at 17. A gas inlet is shown at 18, approaching from underground and substantially sealed to a flexible sheet 20 which seals the gases against passing into the ground. This is the usual arrangement for the gas entry; however, the gas can be brought in otherwise, such as by the overhead tube 22 indicated in FIG. 1 as an alternative and passing through a support module.

FIG. 1 shows only a portion of a filter bed platform, which will normally be made up of many more modules than those indicated and will normally be longer in one dimension than the other, i.e. a somewhat elongated rectangle.

The problem of even gas distribution for delivery through the filter medium or through a compost pile (not shown in FIG. 1, shown at 24 in FIG. 3) is discussed above. Normally the gas inlet 18 is located at one end of a large-area, often elongated filter bed platform assembly. Gas distribution, without any intervening control structure, is uneven in such a circumstance. The gas flow out through perforations or orifices 26 which are closest to the gas inlet is far greater than the flow of gas in remote regions. The plenum 28 defined beneath the filter bed support platform is normally not very tall, on the order about 8 inches to 12 inches internal vertical clearance, and this compounds the problem by creating flow resistance over long distances. Within this plenum are a greater number of support legs 30, which add some additional resistance. The above referenced patent disclosed flow-directing vanes, secured to the legs 30, that could be angularly set prior to completion of the filter bed support platform, to deflect and direct gases in an attempt to distribute the flow evenly throughout the plenum and through out the filter medium. However, the vanes were not accessible to be reset once the system was erected, so that they could not be easily readjusted if the flow turned out to be unbalanced.

Figure 2:
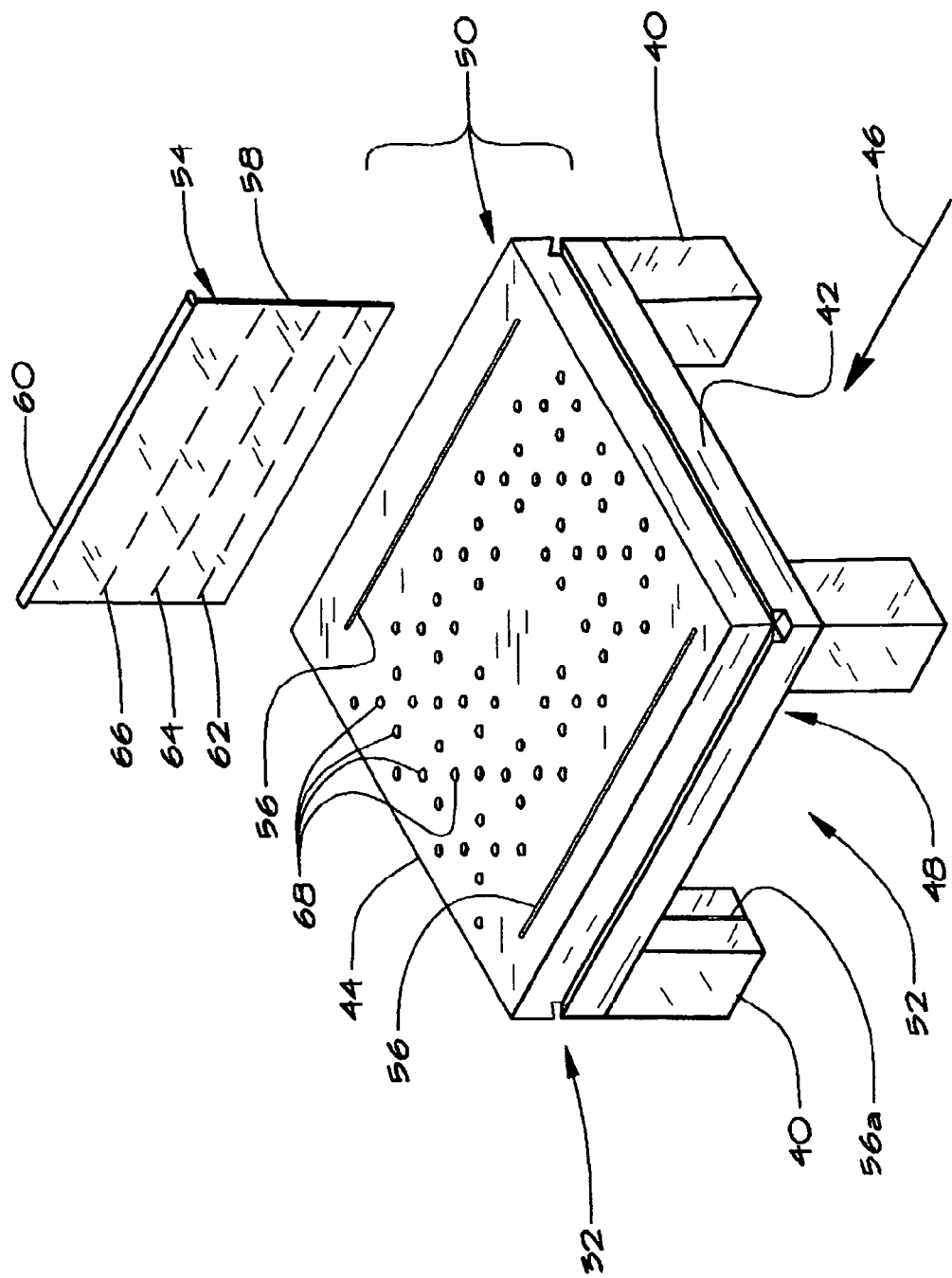
FIG. 2 is a perspective view showing one of a series of special modules that define a flow distribution channel or space within the filter bed support assembly, and indicating one of a pair of slide gates that can be positioned to various depths within slots of the special module.

In the system of the invention, special filter bed platform modules 32 are provided to define a flow channel or flow space within the gas plenum, through which gas is primarily directed en route to the various areas of the plenum, to be delivered through the exit holes 26. One of these special modules or units 32 is shown in FIG. 2, and several are shown in FIG. 1. Each such module has preferably four legs 40, which may be detachable or which might be integrally formed in a rotocasting process, for example. The module 32, as well as the other modules 12, may be formed of polyethylene or a mix of recycled plastics. The flow distribution platform modules 32, which are assembled in a series by connection at interlocking edges 42 and 44, define a flow channel or space as indicated in FIG. 2 by the arrow 46. The space beneath the module 32 is part of the entire plenum 28 of space under the entire filter bed platform assembly, but the series of assembled flow distribution modules 32 define a designated flow channel 46. At left and right sides of 48 and 50 of the series of modules 32, there is also an air space, generally shown at 52. However, that space can be closed, or partially closed, by slide gates such as shown at 54. Slots 56 are formed in generally vertical planes down through the modules 32 at left and right as shown in FIG. 2, for receiving such slide gates. As shown, the slots 56 preferably are defined not only by openings through the horizontal platform module 32, but also by slots 56a (forming a part of the slot 56) in a back side of the forward legs and in a front side (not seen in FIG. 2) of rear legs. The slide gates 54 are thus guided from the top surface of the module 32 down to the surface on which the unit sits, usually a flexible plastic sheet 20 such as shown in FIG. 1.

The slide gate 54 in FIG. 2 includes a planar blade-like gate portion 58 and a flange or lip 60 at the top of the slide gate. Dashed lines 62, 64 and 66 on the planar portion 58 indicate that the gate can be pre-weakened along certain lines, to be broken off to the desired size in the field, or can be field-cut at any length desired.

The flow distribution platform module 32 shown in FIG. 2 is indicated with raised bumps 68 on its surface. These are preferably on all modules, to protect gas exit holes when the unit is scraped with an implement such as a front-end loader or larger equipment. Also, these bumps preferably are high enough to protect the rim or flange 60 of the slide gates 54 from being damaged.

Gas exit holes are not shown on the unit 32 in FIG. 2, although some exit holes can be included. Generally there will be fewer exit holes here than on the remaining field of platform modules, since inlet gas pressure is highest in the channel beneath these units 32.

Figure 3:
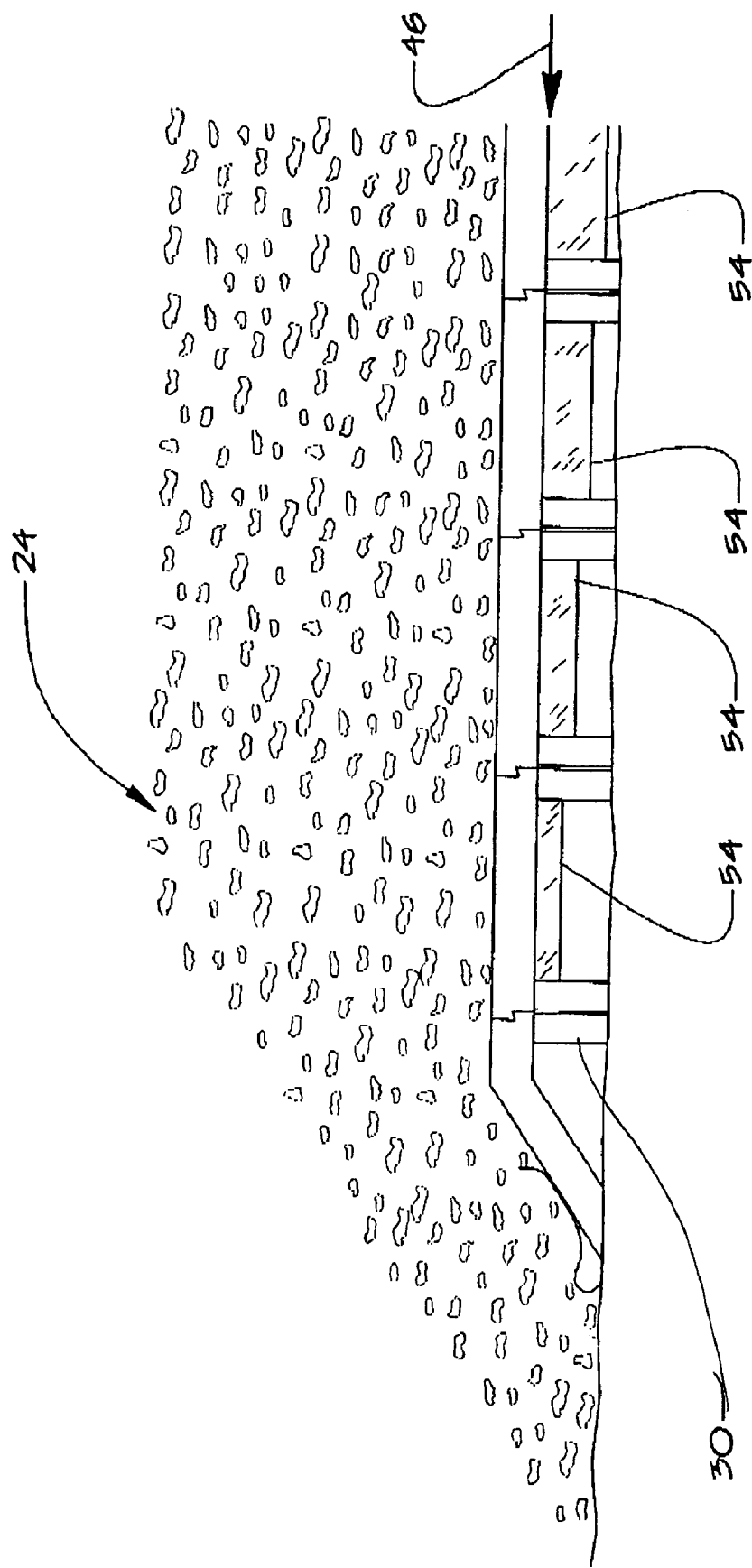
FIG. 3 is a schematic side elevation view in perspective, indicating the system of the invention.

FIG. 3 shows a part of the assembly 10 after placement of the organic filter medium compost material 24 over the platform assembly, in sectional elevation view. This is as seen generally along the line 3-3 in FIG. 1. The figure shows that the slide gates 54, set as desired prior to addition of the filter medium 24, will be at different levels as the distance along the flow channel 46 progresses. Thus, the slide gates 54 are shown progressing from a position closing approximately 75% of the side space in a flow distribution unit, then approximately 50%, 40%, 30%, etc. At the end of the series of flow distribution modules 32 forming the flow channel 46, the slide gates will not be used.

Figure 4:
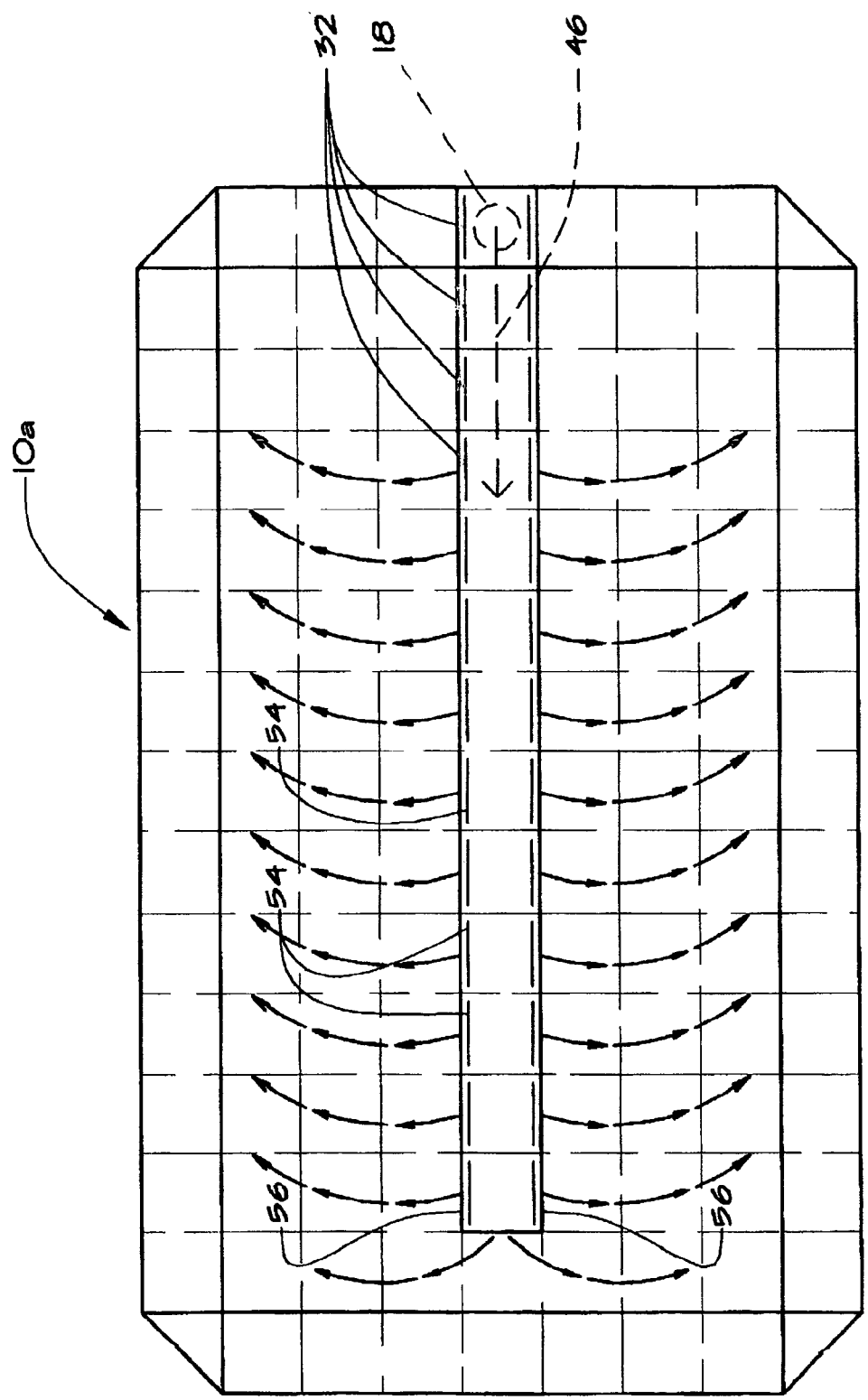
FIG. 4 is a schematic plan view indicating one possible arrangement of the flow distribution modules to form a flow distribution channel that is so configured to tune the distribution of gas throughout the plenum of space under the support apparatus, for optimum distribution throughout the support area.

FIG. 4 schematically indicates one configuration of a filter bed/compost bed platform assembly 10a which can be served by the invention. A gas exit hole is shown in dashed lines at 18, emerging into the plenum from beneath. A series of assembled flow distribution platform modules 32 is shown forming a column or row approximately in the middle of the assembly 10a, although this line of modules could be to the left or right if need be (i.e. lower or higher as seen on the drawing of FIG. 4). The slide gates 54, or the slots 56, are also indicated. Directions of gas flow are very generally indicated by arrows.

Figure 5:
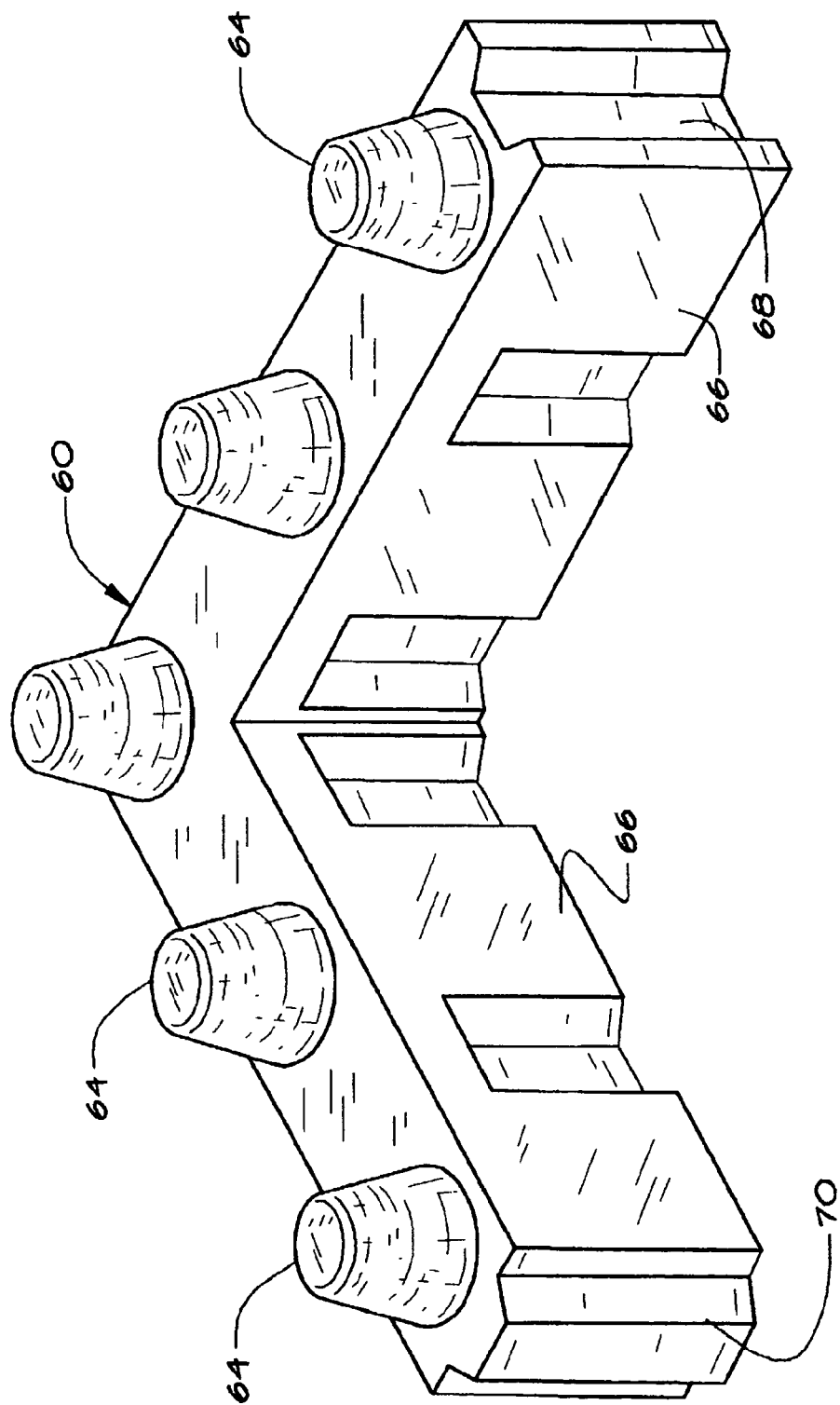
FIG. 5 shows in perspective a corner curtain leg for use with the system of the invention.
Figure 6:
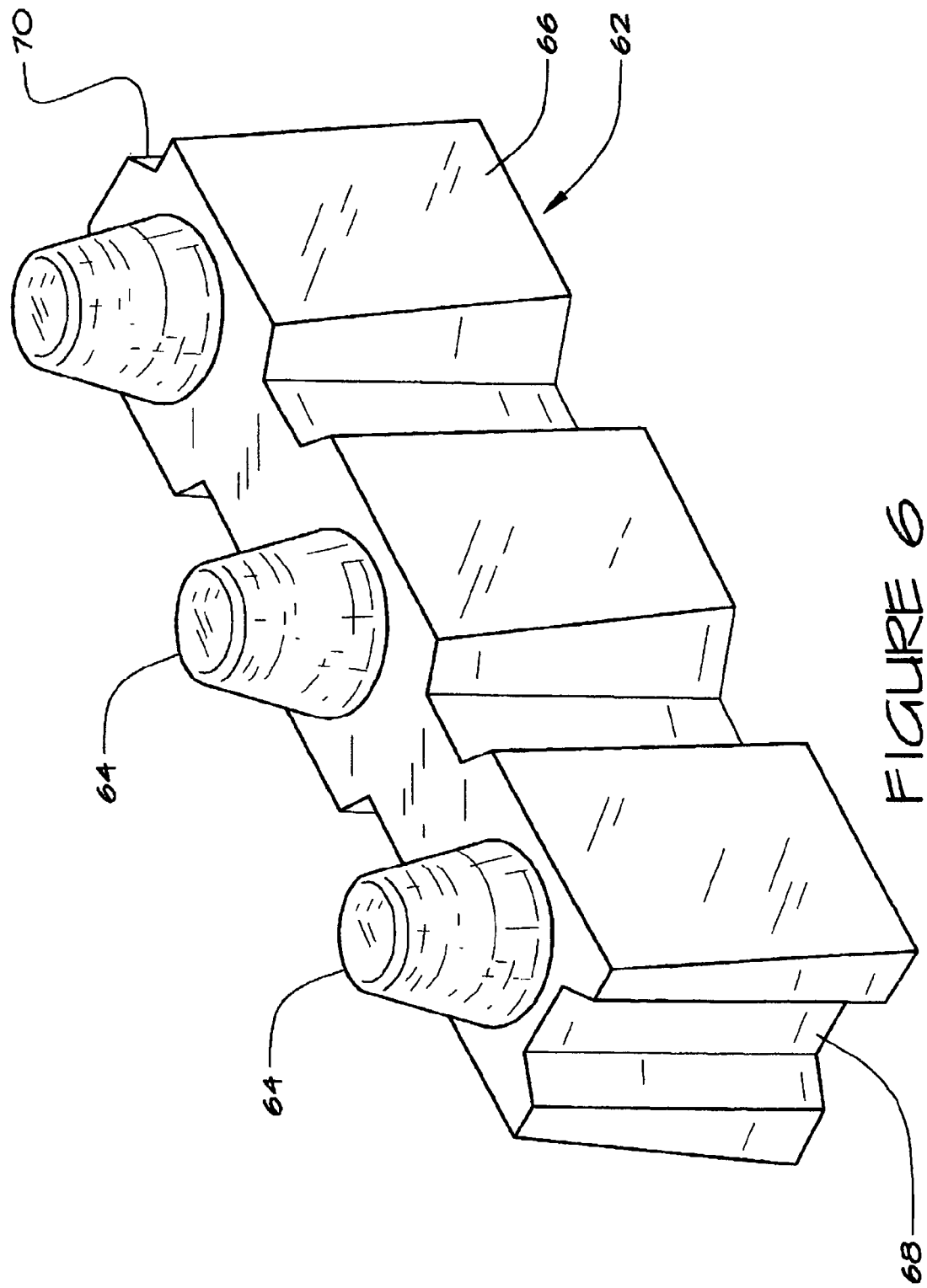
FIG. 6 shows in perspective a straight curtain leg for the system.

FIGS. 5 and 6 show curtain legs that are applicable to the system of the invention. FIG. 5 shows an "L" shaped corner curtain leg 60, with FIG. 6 showing a straight leg 62. The purpose of these curtain legs is to engage in leg sockets of the platform modules at edges of the support bed and to provide a substantial barrier against passage of air or gases out of the plenum formed under the assembly of bed platform modules. These curtain legs thus can replace the edge units shown in FIG. 1. Each of the curtain legs may have tapered studs 64 positioned to engage in tapered leg sockets of the platform modules, and each has a support enclosure structure 66 that closes the plenum space under the platform modules at peripheral edges. If the biofiltration or compost support system is erected in a space with pre-formed walls, such as of concrete, the platform modules can be abutted directly against the walls on at least two sides, or on three sides if the walls are spaced appropriately for the system. Often a fourth side of the assembly, or two sides of the assembly, need to be closed because they do not closely engage against an existing wall. Thus, the curtain legs 60 and 62 are used. As shown in the drawings, each leg has a vertical notch 68 at one end and a complementary shaped vertical ridge 70 at the opposite end. These engage together on assembly, and this connection can be sealed with a flexible sealant if desired.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A modular support system for supporting a bed of filter or compost material through which air or gas is to be passed vertically, with provision for balancing the distribution of gas to be passed through the bed of material, comprising:

(a) a multiplicity of polygonal bed platform modules having generally planar top surfaces and shaped to be arranged side-by-side contiguously to form a bed platform covering a selected area, at least some of the bed platform modules having perforations so as to allow gas to pass through the bed platform, (b) bed support legs having upper ends connected to bottom sides of the bed platform modules, and of length sufficient to support and elevate the bed platform modules above a base surface on which the support system rests to form a plenum under the bed platform modules, (c) a peripheral closure along the periphery of the bed platform and generally closing the plenum, (d) a series of flow distribution platform modules comprising some of the bed platform modules and being arranged contiguously in the bed platform, defining in the plenum a flow distribution channel space beneath the series of flow distribution platform modules, (e) a gas inlet opening into the plenum and communicating with the flow distribution channel space, and (f) the flow distribution platform modules having slots in generally vertical planes near left and right sides of the modules, and including slide gates configured to be assembled down into the slots and to hang down into the plenum sufficiently to close off the respective sides of the flow distribution channel space to a desired degree at each side of each flow distribution platform module, whereby prior to the placement of the bed of filter or compost material on the modular bed platform, air or gas can be directed through the gas inlet and into the plenum, flow of gas through the various perforated bed platform modules can be reviewed, and the slide gates can be placed, adjusted and reconfigured such that optimum balance of flow through the various bed platform modules can be achieved via adjustment of such slide gates and corresponding control of the flow of gas through and out of the sides of the flow distribution channel space.

2. The modular support system of claim 1, wherein the slide gates are formed of molded plastic material, shaped generally as planar blades and including a top flange wider than the slot, for supporting the slide gate against the top of the slot.

3. The modular support system of claim 1, wherein the slide gates are essentially fully closed near the gas inlet and open to a progressively greater extent remote from the gas inlet along the length of the flow distribution channel space.

4. The modular support system of claim 1, wherein the base surface is covered with a sheet of plastic material through which the gas inlet passes, the bed support legs and the peripheral members resting on the plastic sheet, such that the plenum is generally sealed against gas passage except through the perforations.

5. The modular support system of claim 1, wherein the flow distribution platform modules are substantially rectangular and have four legs, substantially at corners, the legs having vertical grooves forming a part of said slots, such that the slide gate slides down through the upper surface of the flow distribution platform module in said slot and is guided and generally retained by the grooves in the legs.

6. The modular support system of claim 1, wherein the bed platform modules and flow distribution platform modules are formed of rotocast plastic material.

7. A modular support system for supporting a bed of filter or compost material through which air or gas is to be passed vertically, with provision for balancing the distribution of gas to be passed through the bed of material, comprising:
   (a) a multiplicity of polygonal bed platform modules having generally planar top surfaces and shaped to be arranged side-by-side contiguously to form a bed platform covering a selected area, at least some of the bed platform modules having perforations so as to allow gas to pass through the bed platform,
   (b) bed support legs having upper ends connected to bottom sides of the bed platform modules, and of length sufficient to support and elevate the bed platform modules above a base surface on which the support system rests to form a plenum under the bed platform modules,
   (c) an edge closure along the periphery of the bed platform and generally closing the plenum,
   (d) a series of flow distribution platform modules comprising some of the bed platform modules and being arranged contiguously in the bed platform, defining in the plenum a flow distribution channel space beneath the series of flow distribution platform modules,
   (e) a gas inlet opening into the plenum and communicating with the flow distribution channel space, and
   (f) the flow distribution platform modules having adjustable means for closing, to a desired degree between substantially closed and substantially fully open, the flow distribution channel space from the rest of the plenum at sides of each of the flow distribution platform modules, so that gas entering at the inlet opening can be directed as desired to balance the flow of gas throughout the support system.

8. The modular support system of claim 7, wherein the closure means includes manual means for adjusting the degree of closure at each side of each flow distribution platform module from above the modular support system once erected.

9. The modular support system of claim 8, wherein the closure means comprises slots arranged in generally vertical plains near left and right sides of the flow distribution platform module, and slide gates formed as generally thin planar blades and sized to be positioned down into the slots to a desired degree, the slide gates each including a top flange for resting against the top of the slot to retain the slide gate in position.

10. The modular support system of claim 7, wherein the edge closure comprises molded plastic curtain legs at one or more peripheral edges of the bed platform, connected to bottom sides of the bed platform modules in place of bed support legs.

11. In a modular support system for supporting a bed of material through which air is to be passed vertically, the modular support system being made up of a multiplicity of polygonal bed platform modules having generally planar top surfaces and configured to be arranged side by side contiguously to form a bed platform covering a selected area, the improvement comprising a series of flow distribution platform modules for positioning among the multiplicity of platform modules, each flow distribution platform module including:
   a generally horizontal top surface,
   support legs connected to the top surface and extending downward to support the flow distribution platform module on a base surface to define a flow distribution channel space under the top surface and extending along a series of end-to-end similar such flow distribution platform modules,
   slots in the flow distribution platform modules, extending downwardly through the generally horizontal top surface, the slots being positioned in generally vertical planes near left and right sides of the modules, and
   slide gates configured to be assembled down into the slots and to hang down adjacent to the flow distribution channel space sufficiently to close off the respective sides of the channel space to a desired degree at each side of each flow distribution platform module,
   whereby, prior to the placement of a bed of material on a modular bed platform including the flow distribution platform modules, the slide gates can be adjusted to various positions of closure at various positions along the series of such modules to balance a test flow of air or gas entering the flow distribution channel space en route to the remaining space of the modular support system.

12. The improvement defined in claim 11, wherein the flow distribution platform modules are substantially rectangular and have four legs, substantially at corner, the legs having vertical grooves forming a part of said slots, such that the slide gate slides down through the upper surface of the flow distribution platform module in said slot and is guided and generally retained by the grooves in the legs.

13. The improvement defined in claim 11, wherein the bed platform modules and flow distribution platform modules are formed of rotocast plastic material.

14. The improvement defined in claim 11, wherein the slide gates are formed of molded plastic material, shaped generally as thin planar blades with a top flange wide enough to support the slide gate from the top of the slot.

15. A method for erecting a modular support system for supporting a bed of material through which air or gas is to be passed vertically and for balancing the distribution of gas to be passed through the bed of material after the modular support system is fully erected, comprising:
   (a) assembling together a multiplicity of polygonal bed platform modules having generally planar top surfaces and shaped to be arranged side-by-side contiguously to form a bed platform covering a selected area, at least some of the bed platform modules having perforations so as to allow gas to pass through the bed platform, with bed support legs having upper ends connected to bottom sides of the bed platform modules, and of length sufficient to support and elevate the bed platform above a base surface on which the support system rests to form a plenum under the bed platform modules, (b) providing a peripheral closure along the periphery of the bed platform,
(c) including in the multiplicity of polygonal platform modules a series of flow distribution platform modules arranging the flow distribution platform modules in a contiguous series in the bed platform, defining in the plenum a flow distribution channel space beneath the series of flow distribution platform modules,
(d) providing a gas inlet opening into the plenum and communicating with the flow distribution channel space,
(e) the flow distribution platform modules having slots in generally vertical planes near left and right sides of the modules, and including slide gates configured to be assembled down into the slots and to hang down into the plenum sufficiently to close off the respective sides of the flow distribution channel space to a desired degree at each side of each flow distribution platform module,
(f) prior to the placement of the bed of material on the modular bed platform, directing air or gas through the gas inlet and into the plenum and into the flow distribution channel space, measuring the flow of gas through the various perforated bed platform modules at various locations, and placing and adjusting the slide gates in the slots and again measuring the flow of gas until optimum balance of flow through the various bed platform modules is achieved via optimal adjustment of the slide gates and corresponding control of the flow of gas through and out of the sides of the flow distribution channel space at various locations.

\* \* \* \* \*